(12) United States Patent
He et al.

(10) Patent No.: US 12,309,102 B2
(45) Date of Patent: May 20, 2025

(54) INFORMATION SENDING METHOD AND APPARATUS, STORAGE MEDIUM, AND ELECTRONIC APPARATUS

(71) Applicant: ZTE CORPORATION, Guangdong (CN)

(72) Inventors: Zhen He, Guangdong (CN); Shujuan Zhang, Guangdong (CN); Hao Wu, Guangdong (CN); Yu Ngok Li, Guangdong (CN); Jun Xu, Guangdong (CN); Mengzhu Chen, Guangdong (CN); Zhaohua Lu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 465 days.

(21) Appl. No.: 17/421,793

(22) PCT Filed: Jan. 10, 2020

(86) PCT No.: PCT/CN2020/071446
§ 371 (c)(1),
(2) Date: Jul. 9, 2021

(87) PCT Pub. No.: WO2020/143775
PCT Pub. Date: Jul. 16, 2020

(65) Prior Publication Data
US 2022/0094505 A1 Mar. 24, 2022

(30) Foreign Application Priority Data
Jan. 11, 2019 (CN) .......................... 201910028152.5

(51) Int. Cl.
*H04L 1/00* (2006.01)
*H04L 5/00* (2006.01)

(52) U.S. Cl.
CPC .......... *H04L 5/0058* (2013.01); *H04L 1/0026* (2013.01)

(58) Field of Classification Search
CPC ... H04L 5/0058; H04L 1/0026; H04L 5/0048; H04L 5/0091; H04L 1/0027;
(Continued)

(56) References Cited

U.S. PATENT DOCUMENTS

2015/0009815 A1 1/2015 Hsu et al.
2017/0295590 A1 10/2017 Loehr et al.
(Continued)

FOREIGN PATENT DOCUMENTS

CN 105210445 A 12/2015
CN 108111267 A 6/2018
(Continued)

OTHER PUBLICATIONS

Discussion on CSI report enhancement for CDRX, 3GPP TSG RAN WG1 Meeting #95, R1-1812891, Spokane, USA, Nov. 12-16, 2018 (Year: 2018).*
(Continued)

*Primary Examiner* — Ayaz R Sheikh
*Assistant Examiner* — David Zhijun Sun
(74) *Attorney, Agent, or Firm* — KDW Firm PLLC

(57) ABSTRACT

Provided are an information sending method and apparatus, a storage medium and an electronic apparatus. The method includes steps described below. A first communication node determines whether a first triggering condition is satisfied. In response to the first triggering condition being satisfied, the first communication node sends first information on a first resource; where the first information includes at least one of: channel related information or second information. The second information includes at least one of: transmission indication information of a channel and/or signal on a
(Continued)

second resource, or a transmission request of the channel related information.

20 Claims, 7 Drawing Sheets

(58) Field of Classification Search
CPC .... H04L 5/0053; H04W 24/10; H04W 76/27; H04W 76/28; H04W 52/0216; H04W 52/0229; H04W 52/028; H04W 52/0209; H04W 72/21; Y02D 30/70
See application file for complete search history.

(56) References Cited

U.S. PATENT DOCUMENTS

| | | | |
|---|---|---|---|
| 2018/0063883 A1 | 3/2018 | Nagaraja et al. | |
| 2018/0279144 A1* | 9/2018 | Mukherjee | H04W 24/10 |
| 2019/0150138 A1* | 5/2019 | Tang | H04W 72/21 370/329 |
| 2020/0178241 A1* | 6/2020 | Wu | H04L 5/0055 |
| 2020/0267571 A1* | 8/2020 | Park | H04L 5/0051 |
| 2020/0358504 A1* | 11/2020 | Takeda | H04B 7/0626 |
| 2020/0389883 A1* | 12/2020 | Faxér | H04L 5/0053 |

FOREIGN PATENT DOCUMENTS

| | | |
|---|---|---|
| CN | 108111278 A | 6/2018 |
| CN | 108633035 A | 10/2018 |
| CN | 109041227 A | 12/2018 |
| EP | 3416443 A1 | 12/2018 |
| WO | 2017218749 A1 | 12/2017 |
| WO | 2018058584 A1 | 4/2018 |
| WO | 2018106166 A1 | 6/2018 |
| WO | 2018204799 A1 | 11/2018 |

OTHER PUBLICATIONS

The Extended European Search Report dated Jul. 29, 2022, for Application No. 20738271.4 (nine (9) pages).
CMCC. "Discussion on PDCCH-based Power Saving Signal/Channel Design" 3GPP TSG RAN WG1 #97, R1-1906524, Reno, USA May 13-17, 2019, text, sections 1 and 2, 10 pages.
CMCC. "Discussion on CSI Report Enhancement for CDRX" 3GPP TSG RAN WG1 Meeting #95, Spokane, USA, Nov. 12-16, 2018—R1-1812891, text, sections 2 and 3, 5 pages.
Renesas Mobile Europe Ltd. "CSI measurement and reporting in TDD eIMTA" 3GPP TSG RAN WG1 Meeting #74, Barcelona, Spain, Aug. 19-23, 2013—R1-133237, 3 pages.
International Search Report for the International Patent Application No. PCT/CN2020/071446, mailed Apr. 8, 2020, 2 pages.
China National Intellectual Property Administration Search Report issued in CN Application No. 201910028152.5, dated Aug. 13, 2024, 8 pages.
China National Intellectual Property Administration Notice of the First Review Opinion issued in CN Application No. 201910028152.5, dated Aug. 30, 2024, 12 pages.
Chinese Second Office Action for CN Application No. 201910028152.5, dated Jan. 7, 2025, 3 pages.
Chinese Supplementary Search Report for CN Application No. 2019100281525, dated Jan. 2, 2025, 2 pages.

* cited by examiner

INFORMATION SENDING METHOD AND APPARATUS, STORAGE MEDIUM, AND ELECTRONIC APPARATUS

CROSS-REFERENCE TO RELATED APPLICATIONS

This is a National Stage Application, filed under 35 U.S.C. 371, of International Patent Application No. PCT/CN2020/071446, filed on Jan. 10, 2020, which claims priority to Chinese Patent Application No. 201910028152.5 filed with the CNIPA on Jan. 11, 2019, the disclosures of which are incorporated herein by reference in their entireties.

TECHNICAL FIELD

The present disclosure relates to the field of communications, for example, an information sending method and apparatus, a storage medium and an electronic apparatus.

BACKGROUND

Related channel state information (CSI) reporting mechanisms include periodic CSI reporting, semi-persistent CSI reporting and aperiodic CSI reporting. For the periodic CSI reporting, the period thereof is statically configured by radio resource control (RRC), and a user equipment (UE) periodically sends CSI on a physical uplink control channel (PUCCH); for the semi-persistent CSI reporting, activation and deactivation thereof are triggered by a media access control control element (MAC CE), and the CSI is transmitted on the PUCCH or a physical uplink shared channel (PUSCH); the aperiodic CSI reporting is dynamically triggered by downlink control information (DCI) signaling, a UE acquires related information by monitoring a physical downlink control channel (PDCCH), and the CSI is transmitted on the PUSCH.

In addition, to reduce the power consumption of the UE, the concept of discontinuous reception (DRX) is introduced. The basic mechanism of the DRX is to configure a DRX cycle for the UE in an RRC_CONNECTED state. The DRX cycle consists of "on duration for DRX" and "opportunity for DRX". During the time of "on duration for DRX", the UE monitors the PDCCH (in an active state); during the time of "opportunity for DRX", the UE does not monitor the PDCCH (in an idle state) to reduce the power consumption.

However, the preceding manner has disadvantages described below.

For the periodic or semi-persistent CSI reporting, the base station knows too little about the actual mobility of the UE, thus it is difficult for the base station to configure the CSI reporting period of the UE, and frequent beam reporting may result in unnecessary resource waste and adversely affect the power consumption of the UE.

For the aperiodic CSI reporting, the base station knows too little about the actual mobility of the UE so that the base station does not know when to trigger the CSI reporting, which may cause the UE to consume unnecessary power for monitoring the PDCCH.

For the UE configured with the DRX, the changed CSI is reported to the base station only when the UE enters the active state, that is, the CSI change has a relatively large delay.

No effective scheme has yet been proposed.

SUMMARY

Embodiments of the present disclosure provide an information sending method and apparatus, a storage medium and an electronic apparatus, so as to at least reduce the power consumption of a user equipment in the reporting process of channel state information since a base station knows less about the actual mobility of the user equipment.

According to the present disclosure, an information sending method is provided. The method includes steps described below. A first communication node determines whether a first triggering condition is satisfied. In response to the first triggering condition being satisfied, the first communication node sends first information on a first resource; where the first information includes at least one of: channel related information or second information. The second information includes at least one of: transmission indication information of a channel and/or a signal on a second resource, or a transmission request of the channel related information.

According to the present disclosure, an information sending apparatus is provided. The apparatus includes a determination module and a sending module. The determination module is configured to determine whether a first triggering condition is satisfied. The sending module is configured to send first information on a first resource in response to the first triggering condition being satisfied; where the first information includes at least one of: channel related information or second information. The second information includes at least one of: transmission indication information of a channel and/or a signal on a second resource, or a transmission request of the channel related information.

According to the present disclosure, a storage medium storing a computer program is further provided. The computer program is configured to, when executed, perform the steps in any one of the preceding method embodiments.

According to the present disclosure, an electronic apparatus is further provided. The electronic apparatus includes a memory and a processor. The memory stores a computer program, and the processor is configured to execute the computer program to perform the steps in any one of the preceding method embodiments.

Through the present application, in response to the first triggering condition being satisfied, the first communication node sends the first information on the first resource, so that the reporting of information is more flexible to adapt the actual mobility of the UE. Therefore, the power consumption of the user equipment in the reporting process of channel state information since a base station knows less about the actual mobility of the user equipment is reduced.

BRIEF DESCRIPTION OF DRAWINGS

The drawings described herein are used to provide a further understanding of the present disclosure and form a part of the present disclosure. The example embodiments and descriptions thereof in the present disclosure are used to explain the present disclosure and not to limit the present disclosure in any improper way. In the drawings.

DETAILED DESCRIPTION

Hereinafter, the present disclosure will be described in detail with reference to the drawings and in conjunction with the embodiments. It is to be noted that if not in collision, the embodiments and features therein in the present disclosure may be combined with one another.

It is to be noted that the terms "first", "second" and the like in the description, claims and drawings of the present disclosure are used to distinguish between similar objects and are not necessarily used to describe a particular order or sequence.

Embodiment One

Figure 1:
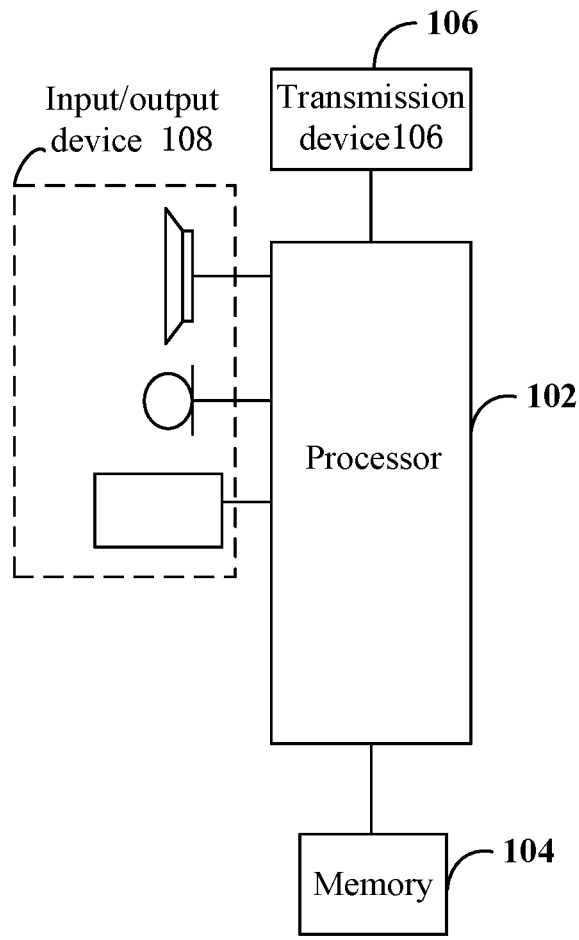
FIG. 1 is a block diagram of hardware of a UE for implementing an information sending method according to an embodiment of the present disclosure.

The method embodiment provided by embodiment one of the present disclosure may be executed in a user equipment (UE), a computer UE or other similar computing apparatuses. In the example in which the method is executed in a UE, FIG. 1 is a block diagram of hardware of a UE for implementing an information sending method according to an embodiment of the present disclosure. As shown in FIG. 1, the UE may include one or more (merely one is shown in FIG. 1) processors 102 (the processors 102 may include, but are not limited to, a microcontroller unit (MCU), a field-programmable gate array (FPGA) and other processing apparatuses) and a memory 104 used for storing data. In an embodiment, the preceding UE may further include a transmission device 106 for implementing the communication function and an input/output device 108. It is to be understood by those of ordinary skill in the art that the structure shown in FIG. 1 is merely illustrative and not intended to limit the structure of the preceding UE. For example, the UE may further include more or fewer components than the components shown in FIG. 1, or has a configuration different from the configuration shown in FIG. 1.

The memory 104 may be configured to store a computer program such as a software program and a module of application software, for example, the computer program corresponding to the information sending method in the embodiment of the present disclosure. The processor 102 executes the computer program stored in the memory 104 to perform various functional applications and data processing, that is, to implement the preceding method. The memory 104 may include a high-speed random access memory, and may further include a non-volatile memory such as one or more magnetic storage apparatuses, flash memories or other non-volatile solid-state memories. In some examples, the memory 104 may further include memories located remotely relative to the processor 102, and these remote memories may be connected to the UE via a network. The examples of the preceding network include, but are not limited to, Internet, an intranet, a local area network, a mobile communication network and a combination thereof.

The transmission apparatus 106 is configured to receive or send data via a network. The examples of the preceding network may include a wireless network provided by a communication provider of the UE. In an example, the transmission device 106 includes a network interface controller (NIC), which may be connected to other network devices via a base station, thereby communicating with the Internet. In an example, the transmission device 106 may be a radio frequency (RF) module, which is configured to communicate with the Internet in a wireless way.

Figure 2:
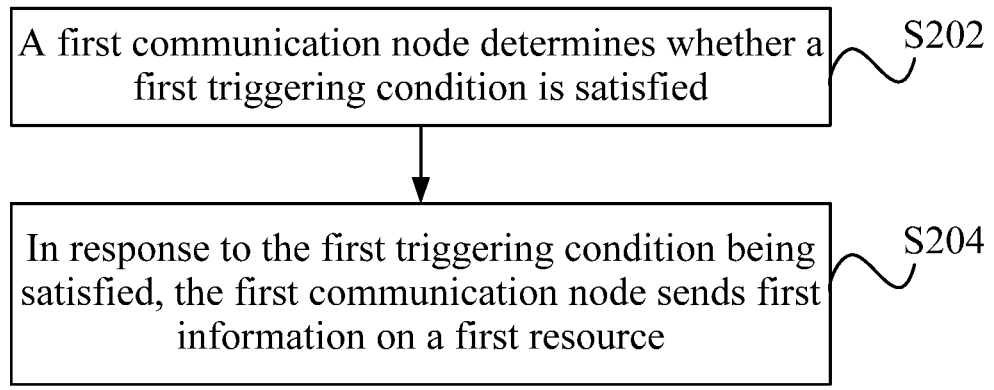
FIG. 2 is a flowchart of an information sending method according to an embodiment of the present disclosure.

An information sending method executed on the preceding UE is provided in the embodiment. FIG. 2 is a flowchart of an information sending method according to an embodiment of the present disclosure. As shown in FIG. 2, the flow includes steps described below.

In step S202, a first communication node determines whether a first triggering condition is satisfied.

In step S204, in response to the first triggering condition being satisfied, the first communication node sends first information on a first resource; where the first information includes at least one of: channel related information or second information.

The second information includes at least one of: transmission indication information of a channel and/or a signal on a second resource, or a transmission request of the channel related information.

Through step S202 and step S204 of the present disclosure, in response to the first triggering condition being satisfied, the first communication node sends the first information on the first resource, so that the reporting of information is more flexible and the actual mobility of the UE is adapted to. Therefore, the power consumption issue of the user equipment in the reporting process of channel state information since a base station knows less about the actual mobility of the user equipment is solved.

In an alternative implementation of the embodiment, the manner in which the first communication node determines whether the first triggering condition is satisfied involved in step S202 of the present embodiment may be that the first communication node determines whether the first triggering condition is satisfied according to at least one of: a sounding reference signal resource, whether the channel and/or the signal requires to be sent on the second resource, whether a wake up signal (WUS) is received, or whether the sounding reference signal resource is configured and/or transmitted in an idle state.

In an alternative implementation of the embodiment, the first triggering condition involved in the present embodiment includes at least one of the conditions described below.

(1) A current reference signal resource indicator is different from a reference signal resource indicator previously reported by the first communication node.

(2) The number of times that a difference value between the current maximum reference signal received power (RSRP) value and an RSRP value previously reported by the first communication node is greater than a first predetermined threshold is greater than a second predetermined threshold.

(3) Link qualities of N reference signal resources in a first reference signal set are less than a third predetermined threshold; where N is a positive integer.

(4) The number of times that link qualities of all reference signal resources in a second reference signal set are less than a third predetermined threshold is greater than a fourth predetermined threshold.

(5) A link quality corresponding to a previously reported reference signal resource indicator is less than a third predetermined threshold.

(6) The channel and/or the signal require to be sent on the second resource.

(7) The wake up signal (WUS) is received.

It is to be noted that the first information includes the second information in response to at least one of the conditions described below being satisfied.

(1) A correspondence exists between the second resource and the first resource.

(2) A time interval between the second resource and the first resource having a correspondence is greater than or equal to a fifth predetermined threshold.

(3) M periods of the second resource correspond to one period of the first resource.

(4) A period of the first resource is an integer multiple of a period of the second resource.

(5) After M periods of the first resource, one second resource corresponding to the first resource exists.

(6) A frequency domain bandwidth of the first resource where the second information is located is less than a sixth predetermined threshold.

(7) A sequence in a predetermined sequence set sent by the first communication node on the first resource is used for carrying the second information.

(8) A mapping relation exists between a predetermined sequence set and the second information.

(9) After the first communication node sends the first information, the channel and/or the signal are sent on the second resource; where M is a positive integer greater than or equal to 1.

It is to be noted that in the embodiment, the fifth predetermined threshold may be acquired in one of the manners described below. The first communication node receives signaling information, where the signaling information includes information about the fifth predetermined threshold; or the first communication node sends capability information, where the capability information includes information about the fifth predetermined threshold.

Alternatively, the channel and/or the signal on the second resource involved in the embodiment include at least one of: a periodic physical uplink shared channel (PUSCH) resource, a grant-free channel resource, or a channel and/or a signal of the channel related information.

Based on this, the channel or the signal on the second resource and/or the channel related information involved in the present embodiment satisfy the first triggering condition.

In another alternative implementation of the present embodiment, in response to the first information including the second information, the method in the embodiment further includes at least one of steps described below.

(1) The first communication node detects a control channel.

(2) The first communication node determines a third resource according to information in a control channel.

(3) The first communication node sends on a third resource at least one of: the channel or the signal, or the channel related information.

It is to be noted that the present embodiment may include at least one of the followings. The first resource is before an active state; the first communication node determines the first resource according to received signaling information; or the first communication node enters an active state after the first communication node sends the first information.

The first resource involved in the embodiment needs to satisfy one of the conditions described below.

(1) A time difference between an end symbol of the first resource and a first symbol of the active state is greater than or equal to a sixth predetermined threshold.

(2) A time difference between an end symbol of the first resource and a first symbol of the active state is less than or equal to a sixth predetermined threshold.

(3) The first communication node sends the first information at a symbol n, and the first communication node enters the active state at a symbol n+k; where k is a predetermined time interval.

(4) The first resource is after a WUS.

(5) The first resource is between a WUS and a first symbol of the active state.

(6) P active states correspond to one first resource; where P is a positive integer greater than or equal to 1.

(7) Q WUSs correspond to one first resource; where Q is a positive integer greater than or equal to 1.

Steps of the method involved in the embodiment may further include at least one of steps described below.

After the first communication node receives a WUS used for waking up the first communication node, it is determined whether a second triggering condition is satisfied, and in response to the second triggering condition being satisfied, the first information is sent on the first resource; or, in response to the first communication node not receiving the WUS used for waking up the first communication node, the first information is not sent on the first resource.

In an alternative implementation of the present embodiment, whether the second triggering condition is satisfied may be determined according to at least one of: a sounding reference signal resource; or whether the channel and/or the signal require to be sent on the second resource.

In an alternative implementation of the present embodiment, the channel related information is acquired based on a sounding reference signal, and the sounding reference signal resource includes one of: a channel state information reference signal (CSI-RS) or synchronization signal block (SSB) configured and/or transmitted in an idle state; a predetermined configured and/or transmitted CSI-RS or SSB; a CSI-RS or SSB configured and/or transmitted in a measurement window; or a configured and/or transmitted CSI-RS or SSB closest to the first resource and having a time interval greater than a seventh predetermined threshold.

The measurement window satisfies at least one of: being determined according to received signaling information, being at a predetermined time domain position, being in an idle state, or having a distance from the first resource greater than an eighth predetermined threshold.

In an embodiment, the channel related information involved in the present embodiment includes at least one of a rank indicator (RI), a channel quality indicator (CQI), a precoding matrix indicator (PMI), a CSI-RS resource indicator (CRI), an SSB resource indicator (SSBRI), an RSRP, a signal to interference plus noise ratio (SINR), new beam information, a beam group identifier (ID), quasi co-location (QCL) information, a reference signal resource set ID or an antenna group ID.

In an alternative implementation of the present embodiment, the method in the present embodiment may further include step 106 and step 108.

In step S106, in response to the first triggering condition being not satisfied, the first communication node does not send the first information.

In step S108, in response to the first triggering condition being not satisfied, the first communication node sends third information on the first resource.

The third information is used for indicating at least one piece of the following information: the first communication node is inhibited from sending the channel and/or the signal on the second resource corresponding to the second information, or the first communication node has no first information to send.

In an alternative implementation of the present embodiment, the second resource and/or the first resource include at least one of: a periodic physical uplink control channel (PUCCH) resource, a semi-persistent PUCCH resource, a semi-persistent PUSCH resource, a grant-free channel resource, a periodic uplink channel, a semi-persistent uplink channel, a periodic physical random access channel (PRACH) resource, a periodic reference signal, a semi-persistent reference signal resource or a predetermined resource.

It is to be noted that after the first communication node sends the first information, the method in the present embodiment further includes steps described below. Reference signal indication information included in the first information is updated into a predetermined quasi co-location reference signal set; a quasi co-location reference signal of a predetermined channel and/or a predetermined reference signal is updated as reference signal indication information included in the first information and the quasi co-location reference signal is about one type of quasi co-location parameters.

It is to be noted that the one type of quasi co-location parameters involved in the present embodiment are acquired in at least one of manners described below. (1) The one type of quasi co-location parameters include quasi co-location parameters in the predetermined quasi co-location reference signal set; (2) the one type of quasi co-location parameters are determined according to quasi co-location parameters included in a transmission configuration indication (TCI) corresponding to the reference signal indication information; (3) the one type of quasi co-location parameters are determined according to a time domain characteristic of a reference signal corresponding to the reference signal indication information; where the time domain characteristic includes periodicity, aperiodicity and semi-persistency; or (4) the one type of quasi co-location parameters are determined according to whether a repetition sending parameter (repetition) is configured in a reference signal set where a reference signal corresponding to the reference signal indication information is located.

It is to be noted that the second resource and/or the first resource involved in the present embodiment include at least one of a periodic PUCCH resource, a semi-persistent PUCCH resource, a semi-persistent PUSCH resource, a grant-free channel resource, a periodic uplink channel, a semi-persistent uplink channel, a periodic PRACH resource, a periodic reference signal, a semi-persistent reference signal resource or a predetermined resource.

The present disclosure will be described below in conjunction with alternative implementations of the embodiment.

Alternative Implementation One

Figure 3:
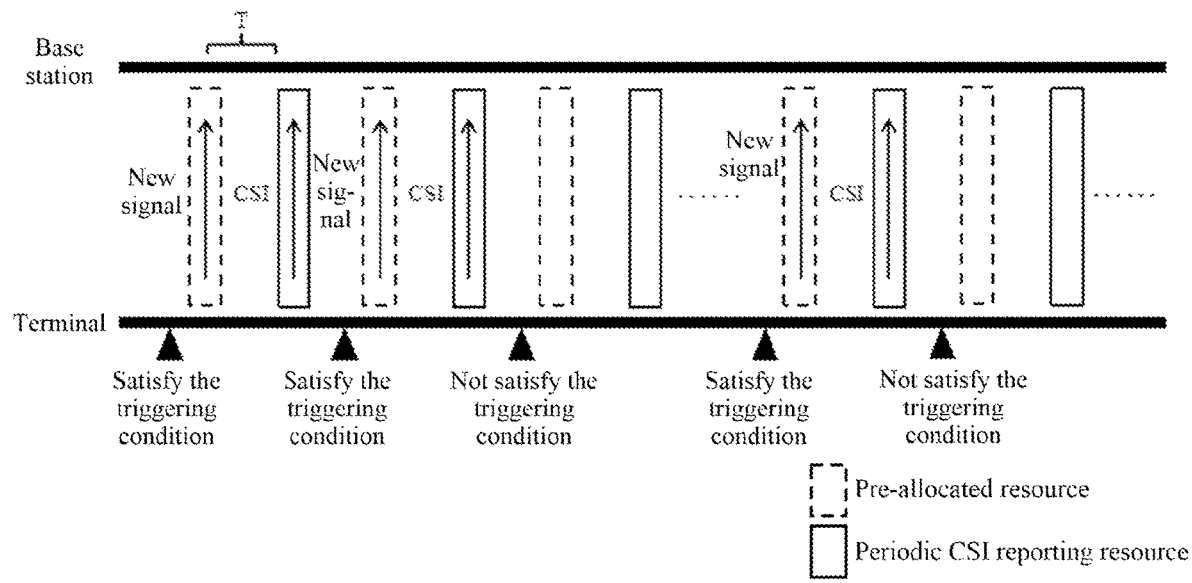
FIG. 3 is schematic diagram one of a periodic CSI reporting method according to an embodiment of the present disclosure.
Figure 4:
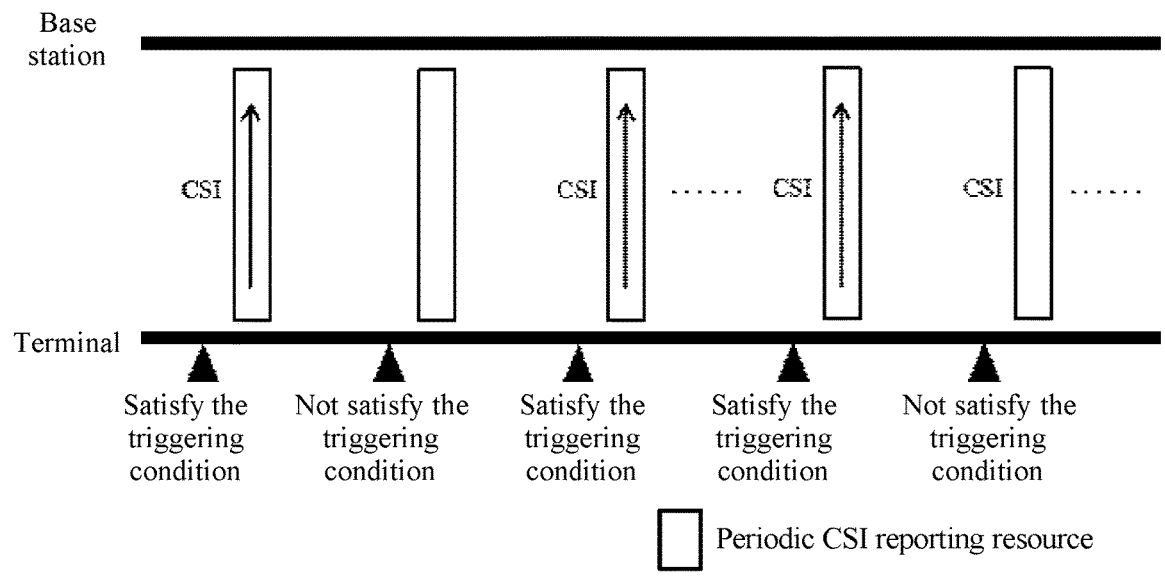
FIG. 4 is schematic diagram two of a periodic CSI reporting method according to an embodiment of the present disclosure.

FIG. 3 is schematic diagram one of a periodic CSI reporting method according to an embodiment of the present disclosure, and FIG. 4 is schematic diagram two of a periodic CSI reporting method according to an embodiment of the present disclosure. Based on FIG. 3 and FIG. 4, the periodic CSI reporting method provided by the alternative implementation includes steps described below.

In step S301, a UE determines whether a triggering condition is satisfied.

In step S302, manner one and/or manner two are included.

In manner one (as shown in FIG. 3), in a case where the triggering condition is satisfied, the UE sends a new signal on a pre-allocated resource; in a case where the triggering condition is not satisfied, the UE does not send the new signal. The new signal is used to indicate that the UE sends CSI on a periodic CSI reporting resource after a period of time (T symbols) after the new signal is sent. T refers to a time difference between the new signal and a first symbol of the periodic CSI reporting resource. T is greater than a predetermined threshold Q, and the value of Q is related to the time for the UE preparing the CSI.

In manner 2 (as shown in FIG. 4), in the case where the triggering condition is satisfied, the UE sends CSI on the periodic CSI reporting resource; in the case where the triggering condition is not satisfied, the UE does not send the CSI.

The periodic CSI reporting resource is a periodic PUCCH resource.

The CSI includes a rank indicator (RI), a channel quality indicator (CQI), a precoding matrix indicator (PM), a CSI-RS resource indicator (CRI), an SSB resource indicator (SSBRI) and an RSRP.

Alternatively, the triggering condition includes at least one of the conditions described below.

In condition one, the CRI corresponding to the currently measured maximum RSRP value is different from the CRI previously reported by the UE.

In condition two, the number of times that a difference value between the currently measured maximum RSRP value and the RSRP value previously reported by the UE is greater than a predetermined threshold Q1 is greater than a predetermined threshold Q2.

Alternatively, the pre-allocated resource includes a periodic PUCCH resource and a periodic PRACH resource.

Alternatively, a resource ID of the pre-allocated resource is configured through the parameter, CSI-ReportConfig.

Alternatively, a new reporting parameter type (reportConfigType) is introduced into the parameter (CSI-ReportConfig): event trigger reporting (Event-trigger report).

Alternatively, the new signal is a specific Zadoff-Chu (ZC) sequence.

Alternatively, the new signal has a bandwidth as small as possible.

Alternative Implementation Two

Figure 5:
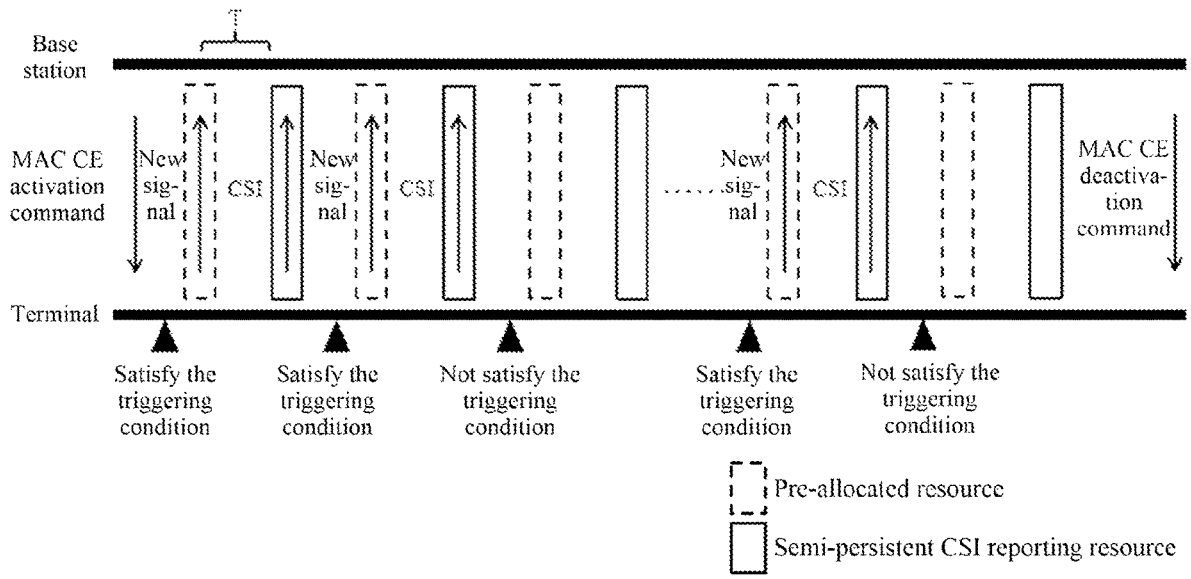
FIG. 5 is schematic diagram one of a semi-persistent CSI reporting method based on an MAC CE according to an embodiment of the present disclosure.
Figure 6:
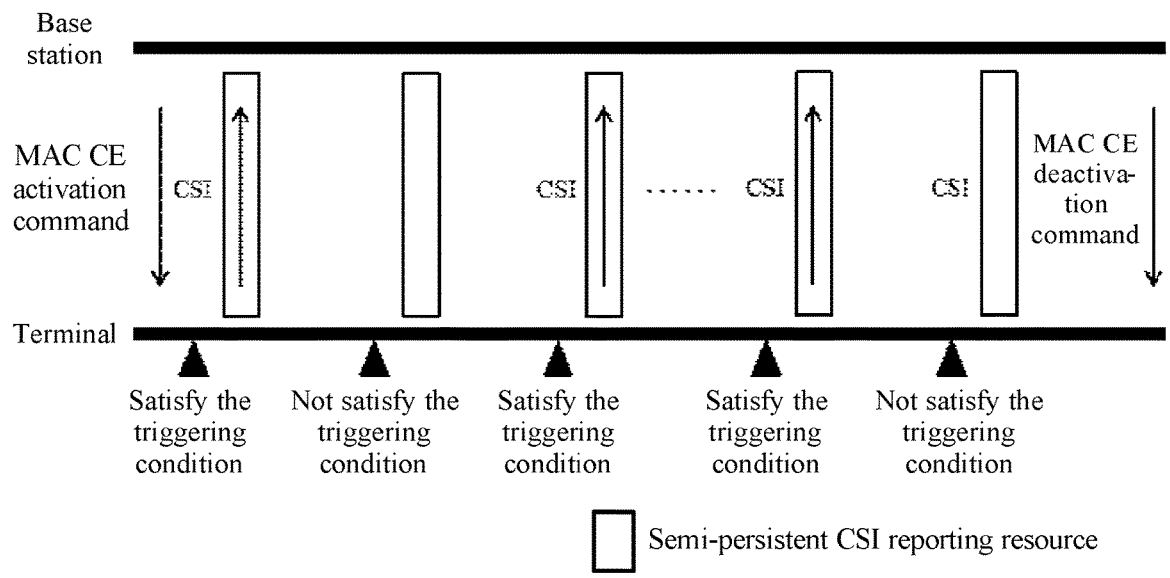
FIG. 6 is schematic diagram two of a semi-persistent CSI reporting method based on an MAC CE according to an embodiment of the present disclosure.

FIG. 5 is schematic diagram one of a semi-persistent CSI reporting method based on an MAC CE according to an embodiment of the present disclosure, and FIG. 6 is schematic diagram two of a semi-persistent CSI reporting method based on an MAC CE according to an embodiment of the present disclosure. Based on FIG. 5 and FIG. 6, the semi-persistent CSI reporting method based on the MAC CE provided by the alternative implementation includes steps described below.

In step S401, a UE receives an MAC CE activation command to trigger the semi-persistent CSI reporting.

In step S402, the UE determines whether a triggering condition is satisfied.

In step S403, two implementation manners are included: manner 1 and manner 2.

In manner 1 (as shown in FIG. 5), in a case where the triggering condition is satisfied, the UE sends a new signal on a pre-allocated resource; in a case where the triggering condition is not satisfied, the UE does not send the new signal. The new signal is used to indicate that the UE sends CSI on a semi-persistent CSI reporting resource after a period of time (T symbols) after the new signal is sent. T refers to a time difference between the new signal and a first symbol of the semi-persistent CSI reporting resource. T is greater than a predetermined threshold Q, and the value of Q is related to the time for the UE preparing the CSI.

In manner 2 (as shown in FIG. 6), in a case where the triggering condition is satisfied, the UE sends CSI on a semi-persistent CSI reporting resource; in the case where the triggering condition is not satisfied, the UE does not send the CSI.

The semi-persistent CSI reporting resource is a semi-persistent PUCCH resource.

The CSI includes an RI, a CQI, a PMI, a CRI, an SSBRI and an RSRP.

Alternatively, the triggering condition includes at least one of the conditions described below.

In condition one, the CRI corresponding to the currently measured maximum RSRP value is different from the CRI previously reported by the UE.

In condition two, the number of times that a difference value between the currently measured maximum RSRP value and the RSRP value previously reported by the UE is greater than a predetermined threshold Q1 is greater than a predetermined threshold Q2.

Alternatively, the pre-allocated resource includes a semi-persistent PUCCH resource and a semi-persistent PRACH resource.

Alternatively, a resource ID of the pre-allocated resource is configured through the parameter, CSI-ReportConfig.

Alternatively, a new reporting parameter type (reportConfigType) is introduced into the parameter (CSI-ReportConfig): event trigger reporting (Event-trigger report).

Alternatively, the new signal is a specific Zadoff-Chu (ZC) sequence.

Alternatively, the new signal has a bandwidth as small as possible.

Alternative Implementation Three

Figure 7:
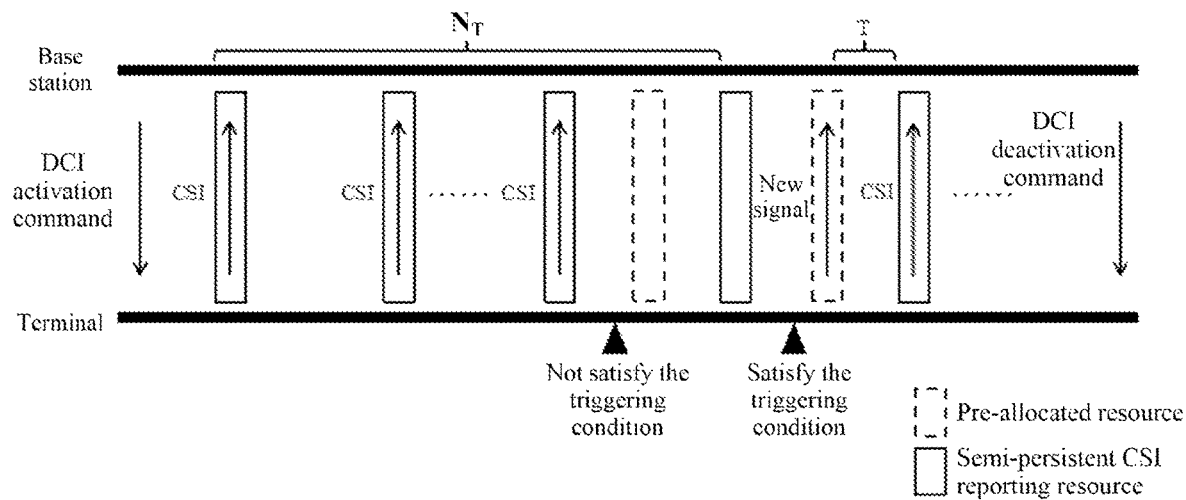
FIG. 7 is schematic diagram one of a semi-persistent CSI reporting method based on DCI according to an embodiment of the present disclosure.
Figure 8:
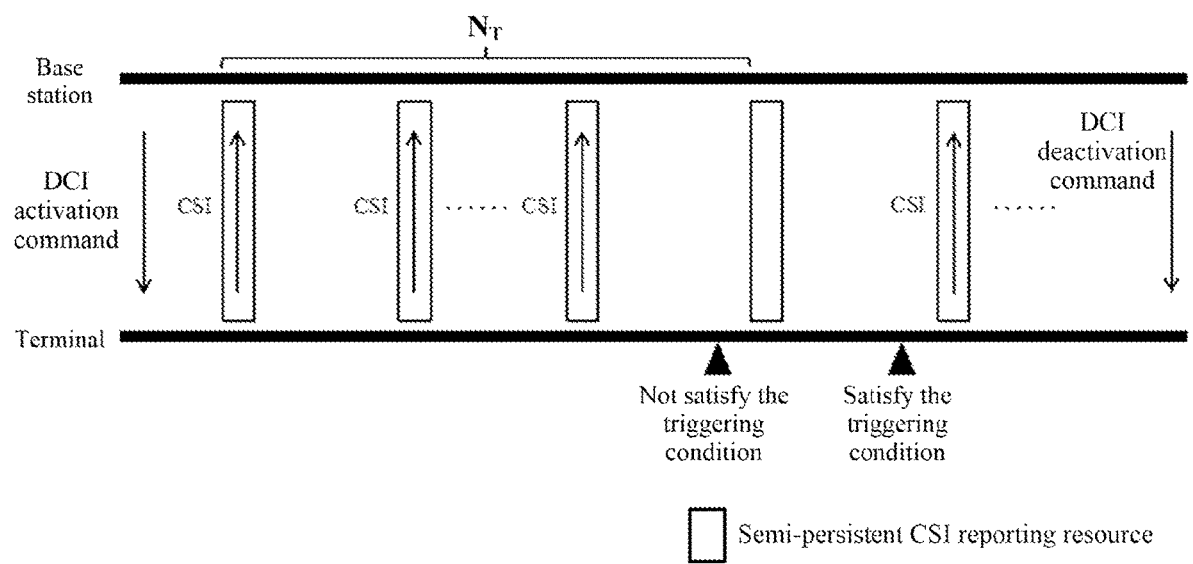
FIG. 8 is schematic diagram two of a semi-persistent CSI reporting method based on DCI according to an embodiment of the present disclosure.

FIG. 7 is schematic diagram one of a semi-persistent CSI reporting method based on DCI according to an embodiment of the present disclosure, and FIG. 8 is schematic diagram two of a semi-persistent CSI reporting method based on DCI according to an embodiment of the present disclosure. Based on FIG. 7 and FIG. 8, the semi-persistent CSI reporting method based on the DCI provided by the alternative implementation includes steps described below.

In step S501, a UE receives a DCI activation command to trigger the semi-persistent CSI reporting.

In step S502, after NT CSI reporting periods, the UE determines whether a triggering condition is satisfied.

In step S503, step S503 includes two implementation manners, that is, manner 1 and manner 2.

In manner 1 (as shown in FIG. 7), in a case where the triggering condition is satisfied, the UE sends a new signal on a pre-allocated resource; in a case where the triggering condition is not satisfied, the UE does not send the new signal. The new signal is used to indicate that the UE sends CSI on a semi-persistent CSI reporting resource after a period of time (T symbols) after the new signal is sent. T refers to a time difference between the new signal and a first symbol of the semi-persistent CSI reporting resource. T is greater than a predetermined threshold Q, and the value of Q is related to the capability of the UE and the time for the UE to prepare the CSI.

In manner 2 (as shown in FIG. 8), in a case where the triggering condition is satisfied, the UE sends the CSI on the semi-persistent CSI reporting resource; in the case where the triggering condition is not satisfied, the UE does not send the CSI.

The semi-persistent CSI reporting resource is a semi-persistent PUSCH resource.

The CSI includes an RI, a CQI, a PMI, a CRI, an SSBRI and an RSRP.

Alternatively, the triggering condition includes at least one of the conditions described below.

In condition one, the CRI corresponding to the currently measured maximum RSRP value is different from the CRI previously reported by the UE.

In condition two, the number of times that a difference value between the currently measured maximum RSRP value and the RSRP value previously reported by the UE is greater than a predetermined threshold Q1 is greater than a predetermined threshold Q2.

Alternatively, the pre-allocated resource includes a semi-persistent PUCCH resource and a semi-persistent PRACH resource.

Alternatively, a resource ID of the pre-allocated resource is configured through the parameter, CSI-ReportConfig.

Alternatively, a new reporting parameter type (reportConfigType) is introduced into the parameter (CSI-ReportConfig): event trigger reporting (Event-trigger report).

Alternatively, the new signal is a specific Zadoff-Chu (ZC) sequence.

Alternatively, the new signal has a bandwidth as small as possible.

Alternative Implementation Four

The status quo of the related art is described below. When link qualities (block error rates, BLERs) of all RSs (i.e., beams) in a downlink reference signal set associated with a current PDCCH are continuously less than a predetermined threshold, a new beam satisfying connection requirements is searched for and reported. Before that, the base station could not know the beam quality in time, that is, which beams in the downlink reference signal set have the BLERs above or below the predetermined threshold.

Through the manners in embodiments, the base station knows the beam quality in time.

It is assumed that q0 is a set of downlink reference signal resources used to detect a beam failure and includes a group of periodic CSI-RS or synchronization signal block (SSB) resources, and the number of resources in the group is N0; beam information includes a CSI-RS resource indicator (CRI) or an SSB resource indicator (SSBRI) or an RSRP. Based on this, during a beam failure recovery (BFR), the present embodiment provides a beam reporting method, where a specific beam corresponds to a specific CSI-RS indicator, that is, the CRI, in a group of CRI-RS resources used for the BFR detection. The method in the embodiment includes steps described below.

In step S602, a UE determines whether a triggering condition is satisfied.

In step S604, in a case where the triggering condition is satisfied, the UE sends beam information on a pre-allocated resource; in a case where the triggering condition is not satisfied, the UE does not send the beam information.

The triggering condition includes one of the conditions described below.

In condition three, link qualities of N (0<N<N0) reference signal resources in current q0 are less than a predetermined threshold.

In condition four, the number of times that link qualities of all reference signal resources in current q0 are less than a predetermined threshold is greater than the predetermined threshold.

In condition five, a current link quality of a CSI-RS or SSB resource corresponding to the previously-reported CRI or SSBRI is less than a predetermined threshold.

Alternatively, the pre-allocated resource includes a periodic PUCCH resource, a periodic PRACH resource and a semi-persistent PUCCH resource.

Alternative Implementation Five

Figure 9:
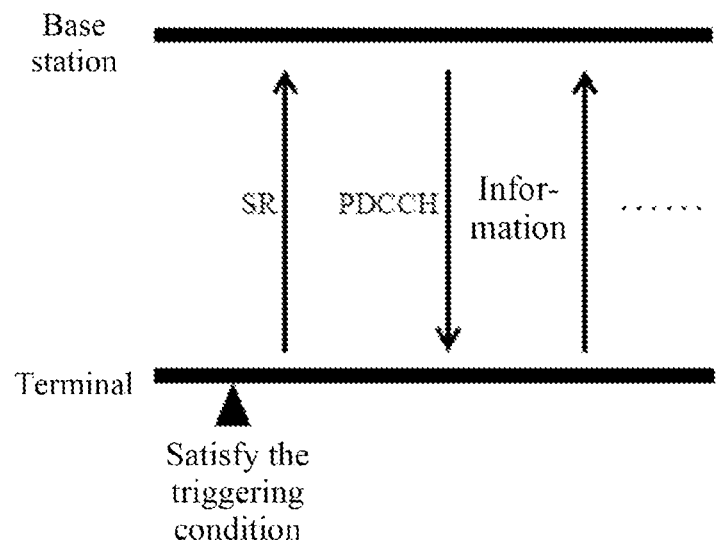
FIG. 9 is schematic diagram one of an information sending method according to an embodiment of the present disclosure.

FIG. 9 is schematic diagram one of an information sending method according to an embodiment of the present disclosure. Based on FIG. 9, the information sending method provided by the alternative implementation includes steps described below.

In step S702, a UE determines whether a triggering condition is satisfied.

In step S704, in a case where the triggering condition is satisfied, the UE sends a scheduling request (SR) to request an information sending resource; in a case where the triggering condition is not satisfied, the UE does not send the SR.

In step S706, after receiving the SR, the base station sends downlink control information (DCI) through a downlink control channel (PDCCH), where the DCI indicates the information sending resource in step S704.

In step S708, after the UE detects the PDCCH and acquires the DCI, information is sent on the information sending resource.

The triggering condition includes the condition described below.

In condition six, the UE has information to send.

Alternative Implementation Six

Figure 10:
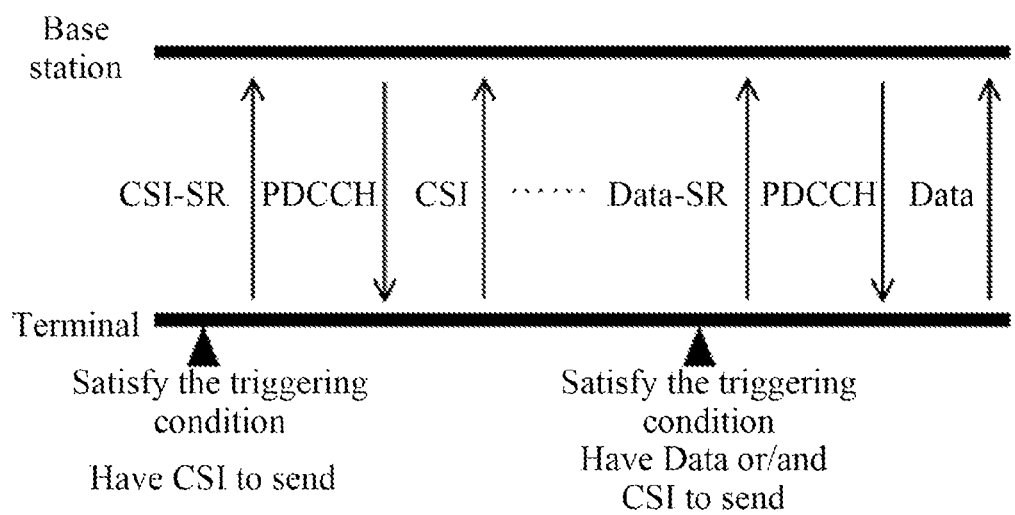
FIG. 10 is schematic diagram two of an information sending method according to an embodiment of the present disclosure.

FIG. 10 is schematic diagram two of an information sending method according to an embodiment of the present disclosure. Based on FIG. 10, the information sending method provided by the alternative implementation includes steps described below.

In step S801, a UE determines whether a triggering condition is satisfied.

In step S802, in a case where the triggering condition is satisfied, the UE sends a channel state information dedicated scheduling request (CSI-SR) to request a CSI sending resource; in a case where the triggering condition five is satisfied, the UE sends a data scheduling request (data-SR) to request the data sending resource; in a case where the triggering condition is not satisfied, the UE does not send the scheduling request.

It is to be noted that in a case where the triggering conditions seven and eight are satisfied at the same time, the UE only sends the data-specified scheduling request (data-SR).

In step S803, after the base station receives the CSI-SR or the data-SR, the downlink control information (DCI) is sent through a downlink control channel (PDCCH).

In step S804, after the UE detects the PDCCH and acquires the DCI, the CSI (or data) is sent on a CSI (or data) sending resource.

The triggering condition includes the conditions described below.

In condition seven, the UE has channel state information (CSI) to send.

In condition eight, the UE has data to send.

Alternative Implementation Seven

Figure 11:
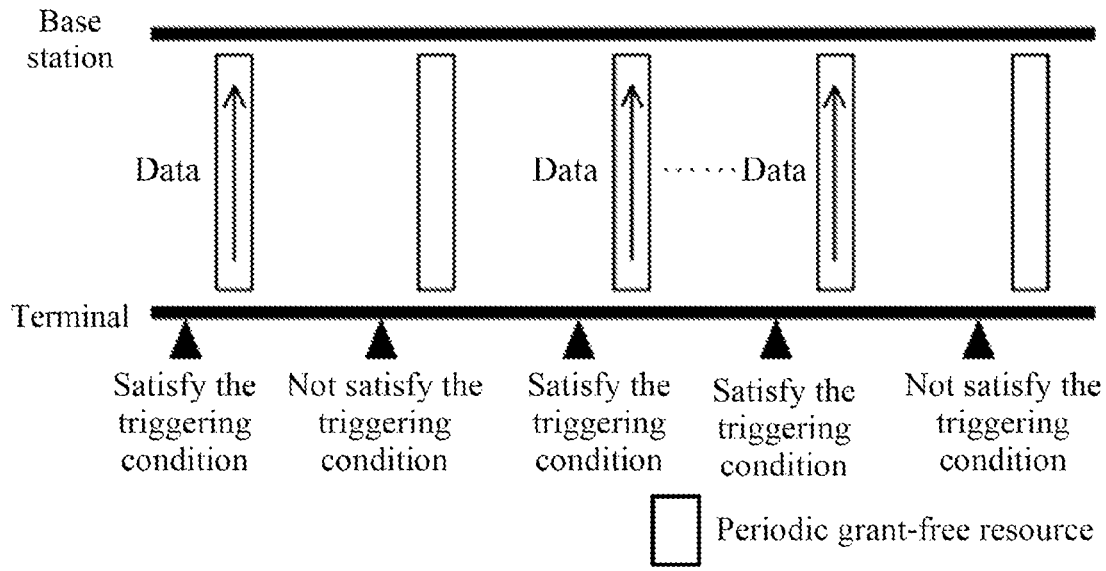
FIG. 11 is a schematic diagram of periodic uplink data transmission triggered based on a UE according to an embodiment of the present disclosure.

FIG. 11 is a schematic diagram of periodic uplink data transmission triggered based on a UE according to an embodiment of the present disclosure. Based on FIG. 11, the periodic uplink data transmission triggered based on a UE provided by the alternative implementation includes steps described below.

In step S901, a UE determines whether a triggering condition is satisfied.

In step S902, in a case where the triggering condition is satisfied, the UE sends data on a pre-allocated periodic grant-free channel resource; in a case where the triggering condition is not satisfied, the UE does not send the data.

The triggering condition includes condition eight: the UE has data to send.

Alternative Implementation Eight

Figure 12:
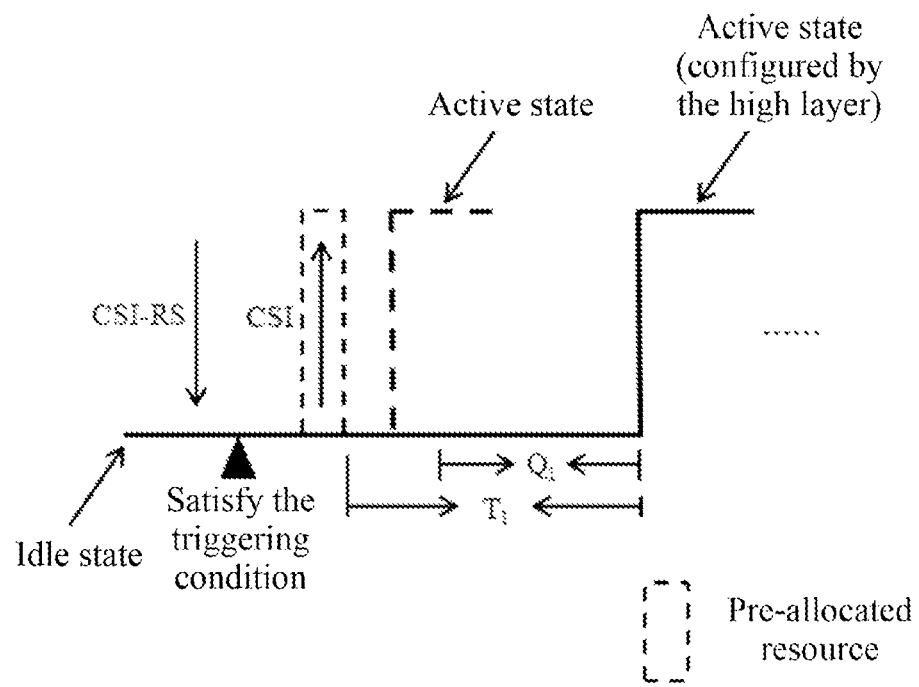
FIG. 12 is schematic diagram one of a DRX method based on a triggering condition according to an embodiment of the present disclosure.

FIG. 12 is schematic diagram one of a DRX method based on a triggering condition according to an embodiment of the present disclosure. Based on FIG. 12, the DRX method based on a triggering condition provided by the alternative implementation includes steps described below.

In step S1001, a UE calculates a channel measurement result according to a measurement resource.

The measurement resource includes one of the followings:
- a CSI-RS or SSB configured and/or transmitted in an idle state;
- a predetermined configured and/or transmitted CSI-RS or SSB;
- a CSI-RS or SSB configured and/or transmitted in a measurement window; where the measurement window satisfies at least one of the following conditions: being determined according to received signaling information, being at a predetermined time domain position, being in an idle state, or having a distance from a first resource greater than a predetermined threshold Y1; or
- a configured and/or transmitted CSI-RS or SSB closest to a first resource and having a time interval greater than a predetermined threshold Y2; where Y2 is related to the time for the UE measuring and preparing CSI.

In step S1002, the UE determines whether a triggering condition is satisfied according to the channel measurement result (such as the CSI).

In a case where the triggering condition is satisfied, the UE executes steps S1003 and S1004 described below; in a case where the triggering condition is not satisfied, the UE continues to be in an idle state.

In step S1003, the UE sends the CSI (assuming that the CSI corresponds to symbol n) on a pre-allocated resource.

In step S1004, after a period of time (k symbols) after the CSI is reported, the UE enters an active state (corresponding to symbol n+k).

The pre-allocated resource is before the active state configured by the high layer and has a distance of T1 symbols from the active state configured by the high layer. T1 refers to a time difference between an end symbol of the pre-allocated resource and a first symbol of the active state configured by the high layer. T1 is greater than or equal to a predetermined threshold Q1; or, T1 is less than or equal to a predetermined threshold Q1.

The CSI includes an RI, a CQI, a PMI, a CRI, an SSBRI and an RSRP.

Alternatively, the pre-allocated resource includes a PUCCH resource, a PUSCH resource and a PRACH resource.

Alternatively, the triggering condition includes one of the conditions described below.

In condition one, the CRI corresponding to the currently measured maximum RSRP value is different from the CRI previously reported by the UE.

In condition two, a difference value between the currently measured maximum RSRP value and the RSRP value previously reported by the UE is greater than a predetermined threshold.

Alternative Implementation Nine

Figure 13:
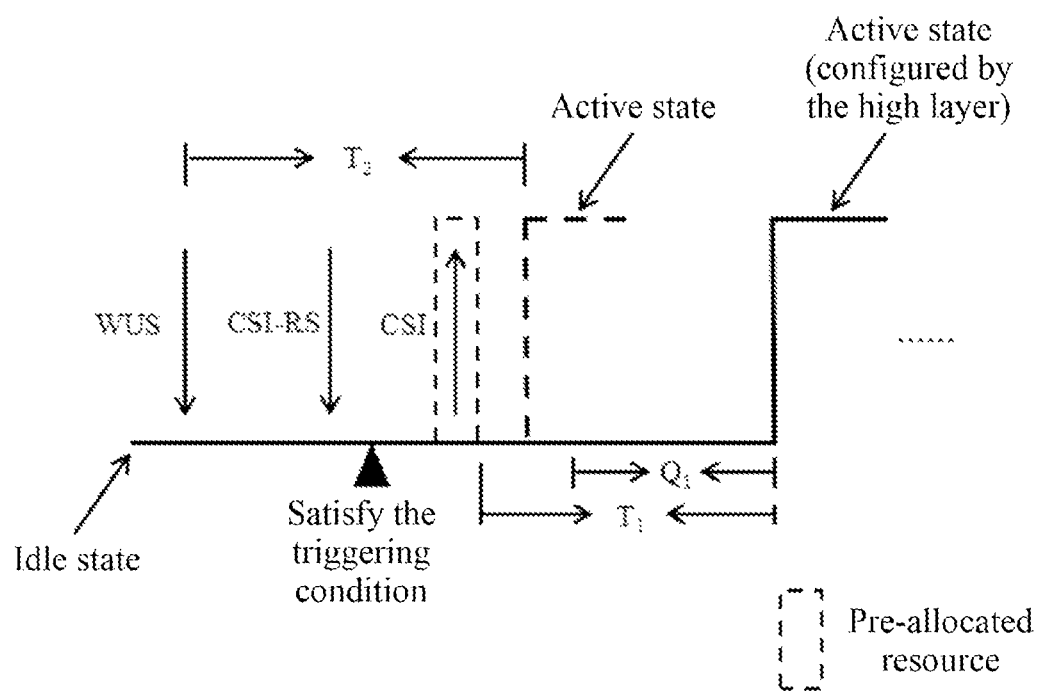
FIG. 13 is schematic diagram two of a DRX method based on a triggering condition according to an embodiment of the present disclosure.

FIG. 13 is schematic diagram two of a DRX method based on a triggering condition according to an embodiment of the present disclosure. Based on FIG. 13, the DRX method based on a triggering condition provided by the alternative implementation includes steps described below.

In step S1101, a UE receives a wake up signal (WUS), where the WUS indicates that the UE enters an active state after T2 symbols.

In step S1102, the UE calculates a channel measurement result according to a measurement resource.

The measurement resource includes one of the followings:

a CSI-RS or SSB configured and/or transmitted in an idle state;

a predetermined configured and/or transmitted CSI-RS or SSB;

a CSI-RS or SSB configured and/or transmitted in a measurement window; where the measurement window satisfies at least one of the following conditions: being determined according to received signaling information, being at a predetermined time domain position, being in an idle state, or having a distance from a first resource greater than a predetermined threshold Y1; or a configured and/or transmitted CSI-RS or SSB closest to a first resource and having a time interval greater than a predetermined threshold Y2, where Y2 is related to the time for the UE to measure and prepare the CSI.

In step S1103, the UE determines whether a triggering condition is satisfied according to the channel measurement result (such as the CSI).

In a case where the triggering condition is satisfied, the UE executes steps S1104 and S1105 described below; in a case where the triggering condition is not satisfied, the UE enters the active state after T2 symbols after receiving the WUS.

In step S1104, the UE sends the CSI (assuming that the CSI corresponds to symbol n) on a pre-allocated resource.

In step S1105, after a period of time (k symbols) after the CSI is reported, the UE enters the active state (corresponding to symbol n+k).

The pre-allocated resource satisfies the characteristics described below.

The pre-allocated resource is before the WUS indicates that the UE enters the active state.

The pre-allocated resource is before the active state configured by the high layer and has a distance of T1 symbols from the active state configured by the high layer. T1 refers to a time difference between an end symbol of the pre-allocated resource and a first symbol of the active state configured by the high layer. T1 is greater than or equal to a predetermined threshold Q1; or, T1 is less than or equal to a predetermined threshold Q1.

The CSI includes an RI, a CQI, a PMI, a CRI, an SSBRI and an RSRP.

Alternatively, the pre-allocated resource includes a PUCCH resource, a PUSCH resource and a PRACH resource.

Alternatively, the triggering condition includes the conditions described below.

In condition one, the CRI corresponding to the currently measured maximum RSRP value is different from the CRI previously reported by the UE.

In condition two, a difference value between the currently measured maximum RSRP value and the RSRP value previously reported by the UE is greater than a predetermined threshold.

Alternative Implementation Ten

The alternative implementation provides a method for updating a transmission configuration indication (TCI) after CSI is reported. First, it is assumed that the reported channel state information (CSI) includes CRInew. CSI-RSnew corresponding to CRInew comes from a CSI-RS resource set.

It is to be noted that steps S1201-1 to S1201-4 correspond to different scenes (or methods); steps S1202-1-1 to S1202-1-3 correspond to a beam indication of the PDCCH; steps 1202-2-1 to S1202-2-3 correspond to a beam indication of the PDSCH. Based on this, the method for updating a TCI after CSI is reported provided by the alternative implementation includes steps described below.

In step S1201-1, in the CSI-RS resource set, each CSI-RS (CRI) corresponds to a predetermined quasi co-location (QCL) type (for example, the QCL type is predetermined as QCL-TypeA+QCL-TypeD), that is, one-to-one correspondence exists. The corresponding QCL type is determined according to CRInew, and thus a new TCI state is determined.

In step S1201-2, CRInew corresponds to CSI-RSnew, the predetermined QCL type corresponding to CSI-RSnew is QCL-TypeA+QCL-TypeD, and the new TCI state is determined according to CRInew and the QCL type.

In step S1201-3, the set is a non-zero power (NZP) CSI-RS set configured with a high layer parameter (repetition) and repetition is set to be on, that is, the set is used for beam management. Therefore, the QCL type may be determined as QCL-TypeA+QCL-TypeD according to CRInew, and thus the new TCI state is determined.

In step S1201-4, the set is a periodic CSI-RS resource set. Therefore, the QCL type may be determined as QCL-TypeA+QCL-TypeD according to CRInew, and thus the new TCI state is determined.

In step S1202-1-1, the last TCI state in a predetermined candidate TCI state pool configured by radio resource control (RRC) layer signaling is deleted, and a new TCI state is added to the end of the candidate TCI state pool.

In step S1202-1-2, the last TCI state in a predetermined TCI state pool on a control resource set (CORESET) is deleted, and a new TCI state is added to the end of the TCI state pool.

In step 1202-1-3, a predetermined TCI state indicated by a media access control control element (MAC CE) is used as a new TCI state.

In step S1202-2-1, the last TCI state in a predetermined candidate TCI state pool configured by radio resource control (RRC) layer signaling is deleted, and a new TCI state is added to the end of the candidate TCI state pool.

In step S1202-2-2, the last TCI state in a predetermined TCI state pool indicated by a media access control control element (MAC CE) is deleted, and a new TCI state is added to the end of the TCI state pool.

In step S1202-2-3, a predetermined TCI state indicated by downlink control information (DCI) is used as a new TCI state.

From the description of the preceding implementations, it will be apparent to those skilled in the art that the method in the preceding embodiment may be implemented by software plus a necessary general-purpose hardware platform or may of course be implemented by hardware. However, in many cases, the former is an exemplary implementation. Based on this understanding, the technical solution provided in the present disclosure substantially, or the part contributing to the related art, may be embodied in the form of a software product. The computer software product is stored on a storage medium (such as a read-only memory (ROM)/ random access memory (RAM), a magnetic disk or an optical disk) and includes several instructions for enabling a UE device (which may be a mobile phone, a computer, a server or a network device) to perform the method of each embodiment of the present disclosure.

Embodiment Two

The embodiments further provide an information sending apparatus. The apparatus is used for implementing the preceding embodiments and exemplary implementations. What has been described will not be repeated. As used below, the term "module" may be software, hardware or a combination thereof capable of implementing predetermined functions. The apparatus in the embodiment described below is implemented by software, but an implementation by hardware or by a combination of software and hardware is also possible and conceivable.

Figure 14:
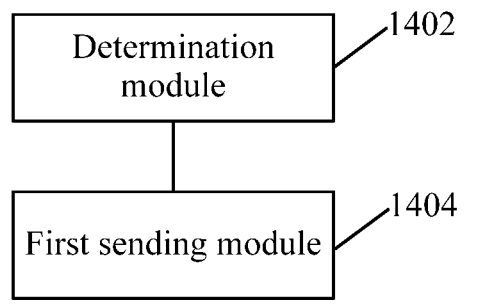
FIG. 14 is a structural diagram of an information processing apparatus according to an embodiment of the present disclosure.

FIG. 14 is a structural diagram of an information sending apparatus according to an embodiment of the present disclosure, and the apparatus is applied to a first communication side. As shown in FIG. 14, the apparatus includes a determination module 1402 and a first sending module 1404. The determination module 1402 is configured to determine whether a first triggering condition is satisfied. The first sending module 1404 is connected to the determination module 1402 and is configured to send first information on a first resource; where the first information includes at least one of: channel related information or second information, in response to the first triggering condition being satisfied.

The second information includes at least one of: transmission indication information of a channel and/or signal on a second resource, or a transmission request of the channel related information.

It is to be noted that in the present embodiment, whether the first triggering condition is satisfied is determined according to at least one of: a sounding reference signal resource; whether the channel and/or the signal require to be sent on the second resource; whether a wake up signal (WUS) is received; or whether a sounding reference signal resource is configured and/or transmitted in an idle state.

In an alternative implementation of the embodiment, the first triggering condition involved in the present embodiment includes at least one of the conditions described below.

(1) A current reference signal resource indicator is different from a reference signal resource indicator previously reported by the first communication node.

(2) The number of times that a difference value between the current maximum RSRP value and an RSRP value previously reported by the first communication node is greater than a first predetermined threshold is greater than a second predetermined threshold.

(3) Link qualities of N reference signal resources in a first reference signal set are less than a third predetermined threshold; where N is a positive integer.

(4) The number of times that link qualities of all reference signal resources in a second reference signal set are less than a third predetermined threshold is greater than a fourth predetermined threshold.

(5) A link quality corresponding to a reference signal resource indicator previously reported is less than a third predetermined threshold.

(6) The channel and/or the signal require to be sent on the second resource.

(7) The wake up signal (WUS) is received.

It is to be noted that the first information includes the second information in response to at least one of the conditions described below being satisfied.

(1) A correspondence exists between the second resource and the first resource.

(2) A time interval between the second resource and the first resource having a correspondence is greater than or equal to a fifth predetermined threshold.

(3) M periods of the second resource correspond to one period of the first resource.

(4) A period of the first resource is an integer multiple of a period of the second resource.

(5) One second resource corresponding to the first resource exists after M periods of the first resource.

(6) A frequency domain bandwidth of the first resource where the second information is located is less than a sixth predetermined threshold.

(7) A sequence in a predetermined sequence set sent by the first communication node on the first resource is used for carrying the second information.

(8) A mapping relation exists between a predetermined sequence set and the second information.

(9) After the first communication node sends the first information, the channel and/or the signal are sent on the second resource; where M is a positive integer greater than or equal to 1.

The fifth predetermined threshold is acquired in one of the following manners: received signaling information, where the signaling information includes information about the fifth predetermined threshold; or capability information sent by the first communication node, where the capability information includes information about the fifth predetermined threshold.

Alternatively, the channel and/or the signal on the second resource involved in the present embodiment include at least one of: a periodic PUSCH resource, a grant-free channel resource, or a channel and/or signal of the channel related information.

Based on this, the channel or the signal on the second resource and/or the channel related information involved in the present embodiment satisfy the first triggering condition.

In addition, the channel and/or signal involved in the present embodiment are sent on the second resource corresponding to the second information. The channel and/or signal include at least one of a periodic PUSCH resource, a grant-free channel resource, or a channel and/or signal including second channel state information. The second channel state information and/or first channel state information satisfy the first triggering condition.

In an alternative implementation of the present embodiment, in response to the first information including the second information, the apparatus further includes at least one of a detection module, a determination module or a second sending module. The detection module is configured to detect a control channel. The determination module is configured to determine a third resource according to information in a control channel. The second sending module is configured to cause the first communication node to send on a third resource at least one of the channel or signal, or the channel related information.

It is to be noted that the first resource is configured before an active period, where the active period is an active period in the DRX; or, after sending the first information, the first communication node from a sleep period of the discontinuous reception (DRX) enters an active period.

The first resource involved in the embodiment satisfies at least one of the conditions described below.
(1) A time difference between an end symbol of the first resource and a first symbol of the active state is greater than or equal to a sixth predetermined threshold.
(2) A time difference between an end symbol of the first resource and a first symbol of the active state is less than or equal to a sixth predetermined threshold.
(3) The first communication node sends the first information at a symbol n, and the first communication node enters the active state at a symbol n+k; where k is a predetermined time interval.
(4) The first resource is after a WUS.
(5) The first resource is between a WUS and a first symbol of the active state.
(6) P active states correspond to one first resource; where P is a positive integer greater than or equal to 1.
(7) Q WUSs correspond to one first resource; where Q is a positive integer greater than or equal to 1.

It is to be noted that the preceding various modules may be implemented by software or hardware. An implementation by hardware may, but may not necessarily, be performed in the following manners: the preceding various modules are located in the same processor, or the preceding various modules are located in their respective processors in any combination form.

Embodiment Three

The embodiments of the present disclosure further provide a storage medium. The storage medium stores a computer program. The computer program is configured to, when executed, perform the steps in any one of the preceding method embodiments.

Alternatively, in the embodiment, the preceding storage medium may be configured to store a computer program for performing steps described below.

In step S1, a first communication node determines whether a first triggering condition is satisfied.

In step S2, in response to the first triggering condition being satisfied, the first communication node sends first information on a first resource; where the first information includes at least one of: channel related information or second information.

The second information includes at least one of: transmission indication information of a channel and/or signal on a second resource, or a transmission request of the channel related information.

Alternatively, in the embodiment, the storage medium may include, but is not limited to, a USB flash disk, a read-only memory (ROM), a random access memory (RAM), a mobile hard disk, a magnetic disk, an optical disk or another medium capable of storing a computer program.

The embodiments of the present disclosure further provide an electronic apparatus including a memory and a processor. The memory stores a computer program, and the processor is configured to execute the computer program to perform the steps in any one of the preceding method embodiments.

Alternatively, the electronic apparatus may further include a transmission device and an input/output device. Both the transmission device and the input/output device are connected to the processor.

Alternatively, in the embodiment, the processor may be configured to perform steps described below through a computer program.

In step S1, a first communication node determines whether a first triggering condition is satisfied.

In step S2, in response to the first triggering condition being satisfied, the first communication node sends first information on a first resource; where the first information includes at least one of: channel related information or second information.

The second information includes at least one of: transmission indication information of a channel and/or signal on a second resource, or a transmission request of the channel related information.

Alternatively, for the examples of the present embodiment, reference may be made to the examples described in the preceding embodiments and alternative implementations. Details are not repeated in the embodiment.

Apparently, it is to be understood by those skilled in the art that the various modules or steps of the present disclosure may be implemented by a general-purpose computing apparatus and may be concentrated on a single computing apparatus or distributed on a network composed of multiple computing apparatuses. Alternatively, the various modules or steps may be implemented by program codes executable by the computing apparatus. Thus, these modules or steps may be stored in a storage apparatus and executed by the computing apparatus. Moreover, in some cases, the illustrated or described steps may be executed in sequences different from those described herein. Alternatively, these modules or steps may be made into integrated circuit modules separately or multiple modules or steps therein may be made into a single integrated circuit module for implementation. In this manner, the present disclosure is not limited to any particular combination of hardware and software.

The above are merely exemplary embodiments of the present disclosure and are not intended to limit the present disclosure. For those skilled in the art, the present disclosure may have various modifications and variations. Any modifications, equivalent substitutions, improvements and the like made within the principle of the present disclosure should fall within the scope of the present disclosure.

What is claimed is:
1. An information sending method, comprising:
determining, by a first communication node, whether or not a first triggering condition is satisfied according to a received measurement reference signal;
in response to the first triggering condition being satisfied, sending, by the first communication node, first information on a first resource; wherein the first information comprises one of the following: transmission indication information of at least one of a signal or a channel comprising channel state related information, or a transmission request of channel state related information; wherein the first resource is a periodic physical uplink control channel (PUCCH) resource, and the channel state related information is acquired based on the received measurement reference signal; and in response to the first information comprising the transmission indication information, after sending the first information, sending, by the first communication node, the at least one of the channel or the signal on a second resource, wherein a correspondence exists between the second resource and the first resource;

wherein the first triggering condition comprises the following:

a current reference signal resource indicator different from a reference signal resource indicator previously reported by the first communication node; and a number of times that a difference value between a current maximum reference signal received power (RSRP) value and an RSRP value previously reported by the first communication node is greater than a first predetermined threshold being greater than a second predetermined threshold.

2. The information sending method according to claim 1, wherein the channel state related information satisfies the first triggering condition.

3. The information sending method according to claim 1, wherein the measurement reference signal comprises a channel state information reference signal (CSI-RS) or synchronization signal block (SSB) received in a measurement window;

wherein the measurement window satisfies at least one of: being determined according to received signaling information, or being at a predetermined time domain position.

4. The information sending method according to claim 1, wherein the channel state related information comprises at least one of: a CSI-RS resource indicator (CRI), an SSB resource indicator (SSBRI), or an RSRP.

5. The information sending method according to claim 1, further comprising at least one of:

in response to the first triggering condition being not satisfied, not sending, by the first communication node, the first information; or in response to the first triggering condition being not satisfied, sending, by the first communication node, third information on the first resource; wherein the third information is used for indicating at least one piece of the following information:

the first communication node not sending at least one of the channel or the signal on the second resource, or the first communication node having no first information to send.

6. The information sending method according to claim 1, wherein the second resource comprises at least one of:

a periodic PUCCH resource, a semi-persistent PUCCH resource, a semi-persistent physical uplink shared channel (PUSCH) resource, or a grant-free channel resource.

7. The information sending method according to claim 1, wherein in response to the first information comprising the transmission request of the channel state related information, the method further comprises:

detecting, by the first communication node, a control channel;

determining, by the first communication node, a third resource according to information in the control channel; and sending, by the first communication node, the channel state related information on the third resource.

8. An electronic apparatus, comprising:
a memory and,
a processor, wherein the memory stores a computer program, and the processor is configured to execute the computer program to perform the following:

determining whether or not a first triggering condition is satisfied according to a received measurement reference signal;

in response to the first triggering condition being satisfied, sending first information on a first resource; wherein the first information comprises one of the following: transmission indication information of at least one of a signal or a channel comprising channel state related information, or a transmission request of channel state related information; wherein the first resource is a periodic physical uplink control channel (PUCCH) resource, and the channel state related information is acquired based on the received measurement reference signal; and in response to the first information comprising the transmission indication information, after the first information is sent, sending the at least one of the channel or the signal on a second resource, wherein a correspondence exists between the second resource and the first resource;

wherein the first triggering condition comprises the following:

a current reference signal resource indicator different from a reference signal resource indicator previously reported by the first communication node; and a number of times that a difference value between a current maximum reference signal received power (RSRP) value and an RSRP value previously reported by the first communication node is greater than a first predetermined threshold being greater than a second predetermined threshold.

9. The electronic apparatus according to claim 8, wherein the channel state related information satisfies the first triggering condition.

10. The electronic apparatus according to claim 8, wherein the measurement reference signal comprises a channel state information reference signal (CSI-RS) or synchronization signal block (SSB) received in a measurement window;

wherein the measurement window satisfies at least one of: being determined according to received signaling information, or being at a predetermined time domain position.

11. The electronic apparatus according to claim 8, wherein the channel state related information comprises at least one of: a CSI-RS resource indicator (CRI), an SSB resource indicator (SSBRI), or an RSRP.

12. The electronic apparatus according to claim 8, wherein the processor is configured to execute the computer program to further perform at least one of the following:

in response to the first triggering condition being not satisfied, not sending the first information; or in response to the first triggering condition being not satisfied, sending third information on the first resource; wherein the third information is used for indicating at least one piece of the following information:

the electronic apparatus not sending at least one of the channel or the signal on the second resource, or the electronic apparatus having no first information to send.

13. The electronic apparatus according to claim 8, wherein the second resource comprises at least one of:
a periodic PUCCH resource, a semi-persistent PUCCH resource, a semi-persistent physical uplink shared channel (PUSCH) resource, or a grant-free channel resource.

14. The electronic apparatus according to claim 8, wherein in response to the first information comprising the transmission request of the channel state related information, the processor is configured to execute the computer program to further perform:
detecting a control channel;
determining a third resource according to information in the control channel; and
sending the channel state related information on the third resource.

15. A non-transitory storage medium storing a computer program, wherein the computer program is configured to, when executed, perform the following:
determining whether or not a first triggering condition is satisfied according to a received measurement reference signal;
in response to the first triggering condition being satisfied, sending first information on a first resource; wherein the first information comprises one of the following: transmission indication information of at least one of a signal or a channel comprising channel state related information, or a transmission request of channel state related information; wherein the first resource is a periodic physical uplink control channel (PUCCH) resource, and the channel state related information is acquired based on the received measurement reference signal; and
in response to the first information comprising the transmission indication information, after the first information is sent, sending the at least one of the channel or the signal on a second resource, wherein a correspondence exists between the second resource and the first resource;
wherein the first triggering condition comprises the following:
a current reference signal resource indicator different from a reference signal resource indicator previously reported by the first communication node; and
a number of times that a difference value between a current maximum reference signal received power (RSRP) value and an RSRP value previously reported by the first communication node is greater than a first predetermined threshold being greater than a second predetermined threshold.

16. The non-transitory storage medium according to claim 15, wherein the channel state related information satisfies the first triggering condition.

17. The non-transitory storage medium according to claim 15, wherein the measurement reference signal comprises a channel state information reference signal (CSI-RS) or synchronization signal block (SSB) received in a measurement window;
wherein the measurement window satisfies at least one of:
being determined according to received signaling information, or being at a predetermined time domain position.

18. The non-transitory storage medium according to claim 15, wherein the channel state related information comprises at least one of: a CSI-RS resource indicator (CRI), an SSB resource indicator (SSBRI), or an RSRP.

19. The non-transitory storage medium according to claim 15, wherein when being executed, the computer program is configured to further perform at least one of the following:
in response to the first triggering condition being not satisfied, not sending the first information; or
in response to the first triggering condition being not satisfied, sending third information on the first resource; wherein the third information is used for indicating at least one piece of the following information:
not sending at least one of the channel or the signal on the second resource, or having no first information to send.

20. The non-transitory storage medium according to claim 15, wherein the second resource comprises at least one of:
a periodic PUCCH resource, a semi-persistent PUCCH resource, a semi-persistent physical uplink shared channel (PUSCH) resource, or a grant-free channel resource.

* * * * *